United States Patent [19]

Williams, Jr. et al.

[11] Patent Number: 5,037,859

[45] Date of Patent: Aug. 6, 1991

[54] COMPOSITE FOAMS

[75] Inventors: Joel M. Williams, Jr.; Alice M. Nyitray, both of Los Alamos; Mark H. Wilkerson, Espanola, all of N. Mex.

[73] Assignee: The United States of America as represented by the United States Department of Energy, Washington, D.C.

[21] Appl. No.: 572,064

[22] Filed: Aug. 24, 1990

Related U.S. Application Data

[62] Division of Ser. No. 368,621, Jun. 20, 1989, Pat. No. 4,966,919.

[51] Int. Cl.$^5$ ................................................ C08J 9/40
[52] U.S. Cl. .................................... 521/55; 521/54; 521/134; 521/136; 521/139; 521/918
[58] Field of Search ............... 521/54, 136, 139, 918, 521/55, 134

[56] References Cited

U.S. PATENT DOCUMENTS

| | | |
|---|---|---|
| 3,573,232 | 3/1971 | Kloker et al. ................. 260/2.5 |
| 3,573,233 | 3/1971 | Alfes et al. .................. 260/2.5 |
| 4,070,310 | 1/1978 | Schneider et al. ............. 260/2.5 |
| 4,110,273 | 8/1978 | Cohnen ....................... 521/59 |
| 4,297,442 | 10/1981 | Blahak ...................... 521/107 |
| 4,430,451 | 2/1984 | Young ........................ 521/64 |
| 4,454,248 | 6/1984 | Pollock et al. ................ 521/53 |
| 4,525,386 | 6/1985 | Wiesman ...................... 427/18 |
| 4,555,313 | 2/1985 | Duchane et al. ................ 204/3 |
| 4,673,695 | 6/1987 | Aubert et al. ................. 521/64 |
| 4,756,898 | 7/1988 | Hoppere et al. ............... 423/44 |
| 4,806,290 | 7/1988 | Hoppere et al. ............... 264/28 |
| 4,832,881 | 5/1989 | Arnold et al. ................. 264/29 |

FOREIGN PATENT DOCUMENTS 2220564 3/1973 France .

OTHER PUBLICATIONS

A. P. Sylvester et al. "Electrically Conductive Reticulated Carbon Composites", Polym. Mater. Sci. Eng.; 58, 1048-1053, (1988).

*Primary Examiner*—Morton Foelak
*Attorney, Agent, or Firm*—Bruce H. Cottrell; Paul D. Gaetjens; William R. Moser

[57] ABSTRACT

Composite foams are provided comprising a first rigid, microcellular, open-celled organic polymer foam having a density of from about 0.015 g/cm$^3$ to about 0.20 g/cm$^3$ and a pore size of from about 1 micron to about 30 microns, said first foam containing a second polymer having a density of from about 0.015 g/cm$^3$ to about 0.20 g/cm$^3$ or a second polymer foam having a density of from about 0.015 g/cm$^3$ to about 0.20 g/cm$^3$ and a pore size of from about 0.01 microns to about 1.0 micron within the open cells of said first foam.

17 Claims, 3 Drawing Sheets

COMPOSITE FOAMS

This invention is the result of a contract with the Department of Energy (Contract No. W-7405-ENG-36)

This is a division of application Ser. No. 07/368,621 filed June 20, 1989 U.S. Pat. No. 4,966,919.

FIELD OF THE INVENTION

The present invention relates to the field of composite foams, and more particularly to composite foams wherein the open cells of a rigid, microcellular polymeric foam are at least partially filled with a second polymer material, preferably either a closed-cell or an open-cell polymeric foam.

BACKGROUND OF THE INVENTION

Plastic, i.e., polymeric foams, can be generally classified as either closed-cell foams or as open-cell foams. Open-cell foams can be formed, e.g., by emulsion techniques or by phase separation techniques. Open-cell foams can also be made by blowing out the faces of closed-cell foams, e.g., by vacuum and the like. Open-cell foams can be used as a matrix to contain various liquids since the open cells are interconnected.

For example, open-cell foams have been investigated for use as targets in inertial confinement fusion (ICF). Useful polymeric foams for ICF should be rigid, have small pores, a low density, a low atomic number and, of course, be open-celled so they may be filled with the liquid deuterium/tritium (D/T). Additionally, it is desirable to have a foam that will wick or take up the liquid by capillary action. U.S. Pat. No. 4,430,451 discloses low density, microcellular foams of poly(4-methyl-1-pentene) which would be saturated with liquid DT as a fusion target.

Similarly, U.S. Pat. No. 4,806,290 discloses machinable and structurally stable, low density microcellular carbon and catalytically impregnated carbon foams useful for inertial confinement fusion targets.

Other potential beneficial uses for open-cell foams include use as absorbers for toxic and hazardous gases, use in chromatography applications, and use as high surface area catalytic substrates. Each such use of open-cell foams demands a particular combination or range of properties.

Previous microcellular foams have been generally prepared of singular, homogeneous materials, e.g., polyethylene, polypropylene, polystyrene, poly(4-methyl-1-pentene), polyacrylonitrile, carbon, silica aerogel, and formaldehyde-resorcinol. Unfortunately, each of these foam materials is limited in the properties that it can provide. For example, silica aerogel and formaldehyde-resorcinol foams have very fine microstructures, i.e., distances between solid masses of less than 0.5 micrometer, but these foams are extremely brittle and cannot be easily machined or handled. In contrast, while linear organic polymers, such as polystyrene, polyethylene, polymethylpentene, or polyacrylonitrile, can be prepared by phase separation processes to yield foams that are usually machinable, such foams have cellular dimensions generally greater than 5 microns.

There have been previous descriptions of modifying polymeric foams to improve different properties of such foams. For example, U.S. Pat. No. 4,525,386 describes a method of enhancing the properties of a layer of open-cell foam material, such as polyurethane or polyvinyl-chloride, by impregnating the open-cell foam with filler particles having dimensions in the micron range in order to enhance properties such as mechanical, thermal, electrical or conductive properties.

U.S. Pat. No. 4,454,258 discloses foams made from polyepoxide and polyurethane resins, the foams made with closed-cells which are then crushed to open the cells so that the foam may be impregnated with, e.g., carbon black or other inorganic materials. It is further disclosed that such inorganic fillers can be secured within the cells of the foam material, e.g., by use of a binder material such as a varnish or adhesive with a phenolic spar varnish being preferred.

U.S. Pat. Nos. 4,239,571 and 4,230,521 disclose impregnating an initially open-cell foam material with a thermosetting resin, such a resin either alone or in combination with reinforcing fibers. Such a process results in a relatively impervious and rigid composite structure.

Polym. Mater. Sci. Eng. 1988, 58, 1049–1053 entitled "Electrically Conductive Reticulated Carbon Composites" by Sylwester et al discloses another modified polymeric foam involving incorporation of an epoxy resin into a carbon foam. The epoxy resin is cured within the structure of the carbon foam and serves to provide the desired mechanical properties to the conductive carbon foam.

Finally, U.S. Pat. No. 4,832,881 discloses low density, open-celled microcellular carbon foams prepared from acrylonitrile-based materials, such foams useful for fabrication of inertial confinement fusion targets, as catalyst supports, as absorbents, and as filters.

Even with all the previous polymer foams and various modified foams, optimum properties have not always been obtainable. The present inventors undertook a search for foams having tailorable properties such as density, cellular dimensions, compressive strength, capillary action (i.e., wicking of liquids), and formability.

Accordingly, it is one object of this invention to provide a composite polymeric material, e.g., a rigid, machinable composite polymeric foam, having both tailorable densities and microcellular dimensions.

It is a further object of this invention to provide a composite polymeric material, e.g., a composite foam that is structurally stable, machinable, and has a high surface area.

Still a further object of this invention is to provide a cryogenic or inertial confinement fusion target comprising a sphere composed of an open-celled polystyrene or carbon foam, the polystyrene or carbon foam containing a second polymeric foam material within the open cells of the polystyrene or carbon foam, said target having densities and cellular dimensions suitable to hold liquid DT by capillary action.

SUMMARY OF THE INVENTION

To achieve the foregoing objects and in accordance with the purposes of the present invention, the present invention provides a composite foam comprising a first rigid, microcellular, open-celled organic polymeric foam having a density of from about 0.015 g/cm$^3$ to about 0.20 g/cm$^3$ and a pore size of from about 1 micron to about 30 microns, the first foam containing a second polymer foam having a density of from about 0.015 g/cm$^3$ to about 0.60 g/cm$^3$ and a pore size of from about 0.01 microns to about 1.0 micron within the open cells of the first foam.

The present invention further provides a composite foam material comprising a first rigid, microcellular, open-celled organic polymer foam selected from the group consisting of polystyrene foam and carbon foam having a density of from about 0.015 g/cm$^3$ to about 0.20 g/cm$^3$ and a pore size of from about 1 micron to about 30 microns, said first polymer foam containing another polymeric foam material having a density of from about 0.01 g/cm$^3$ to about 0.60 g/cm$^3$ and a pore size of from about 0.01 microns to about 1 micron within the cells of the first polymer foam.

In one embodiment of the invention, the polymer foam material contained within the open cells of the first polymer foam substantially completely fills the open cells, while in another embodiment, the polymer foam material contained within the open cells of the first polymer foam coats the walls of the open cells. In still another embodiment of the invention, the polymer foam material contained within the open cells of the first polymer foam is a closed cell foam. In yet another embodiment of the invention, the polymer foam material contained within the open cells of the first polymer foam is an open cell foam.

The present invention further provides a cryogenic (inertial confinement fusion) target comprising a sphere composed of a rigid, microcellular, open-celled polystyrene or carbon foam having a density of from about 0.015 g/cm$^3$ to about 0.20 g/cm$^3$ and a pore size of from about 1 micron to about 30 microns, said polystyrene or carbon foam containing a second polymeric foam material having a density of from about 0.01 g/cm$^3$ to about 0.1 g/cm$^3$ and a pore size of from about 0.01 microns to about 1 micron within the open cells of the polystyrene foam.

The present invention also provides a method of making a composite foam comprising: forming a first rigid, microcellular, open-celled organic polymer foam having a density from about 0.015 g/cm$^3$ to about 0.10 g/cm$^3$ and a pore size of from about 1 micron to about 30 microns; and, filling the open cells of said first foam with a second polymer foam material having a density of from about 0.01 g/cm$^3$ to about 0.60 g/cm$^3$ and a pore size of from about 0.01 microns to about 1.0 microns.

In yet another embodiment of the invention, a composite foam is provided comprising a rigid, microcellular, open-celled organic polymeric foam having a density of from about 0.015 g/cm$^3$ to about 0.20 g/cm$^3$ and a pore size of from about 1 micron to about 30 microns, the first foam containing another polymer material having a density of from about 0.001 g/cm$^3$ to about 0.60 g/cm$^3$ coating the open cell walls of the polymeric foam.

DETAILED DESCRIPTION

Figure 1A:
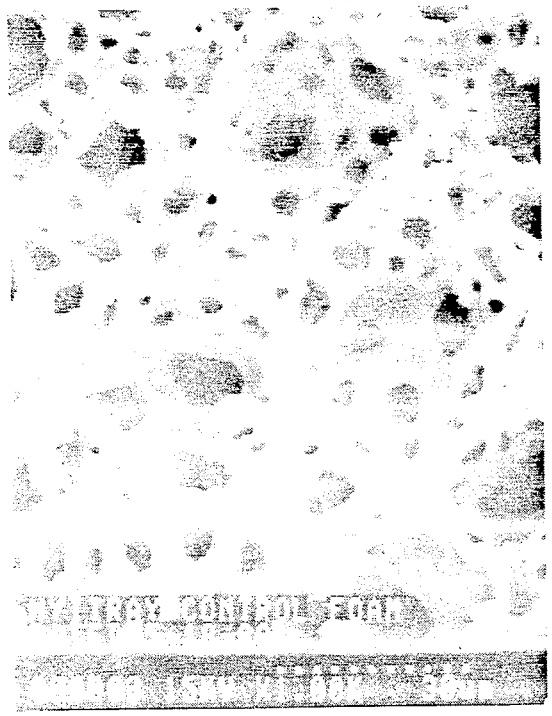
FIG. 1 is a set of scanning electron micrographs showing: (a) a typical polystyrene emulsion foam; (b) a polystyrene foam filled with a 5% by weight silica aerogel foam; and (c) a polystyrene foam filled with a 6% by weight resorcinol-formaldehyde foam.
Figure 1B:
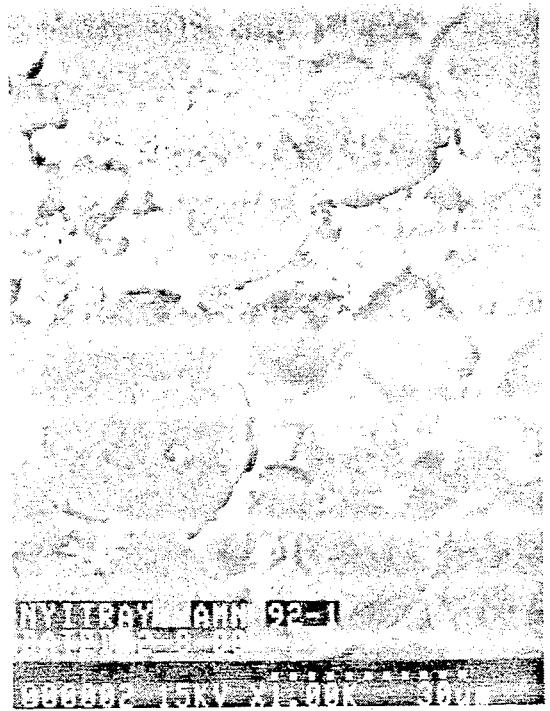
Figure 1C:
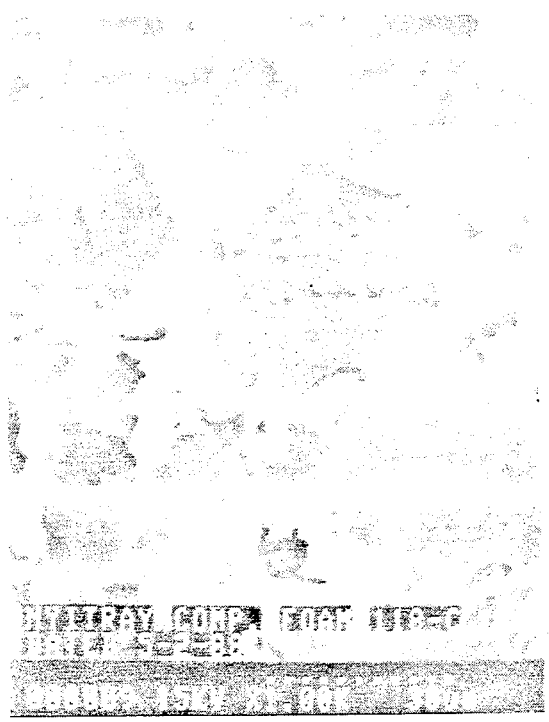

Composite foams have been prepared which combine the best attributes of the combined materials. For example, binary composite foams have been prepared by a backfilling process wherein the cells of a polystyrene emulsion foam have been filled with either silica aerogel or a phenolic, e.g., resole, foam. The results of these backfills were rugged, easily machinable, foam materials having small cell sizes necessary for good wicking of liquids. Good wicking of liquids is a necessary property for foams used as targets in inertial confinement fusion (ICF). Wicking experiments have been conducted with deuterium at the National Bureau of Standards on several of these composite foams. The results indicate that, e.g., a silica aerogel filled polystyrene foam as well as a low density phloroglucinol-formaldehyde (P/F) filled polystyrene foam each achieved better wicking of liquid deuterium than previously tested materials such as polystyrene, silica aerogel or resorcinol-formaldehyde.

Compression tests have indicated that the strength of the composite foam as well as its machinability is determined primarily by the strength of the polystyrene foam, although the filler material, e.g., foam, may contribute to the strength particularly at higher densities of the filler.

The variety of composite foams can include rigid, microcellular, open-celled polymeric foams filled with a second open-celled foam and rigid, microcellular, open-celled foams filled with a closed-celled foam. By "microcellular" is meant a very small celled foam having cell dimensions of from about 1 micron to about 30 microns, preferably from about 1 micron to about 10 microns. The microcellular dimensions provided by this invention are an important aspect of the composite foams. The composite foams of this invention are also low density, i.e., the foams have a combined density of from about 0.015 g/cm$^3$ to about 0.60 g/cm$^3$, preferably from about 0.015 g/cm$^3$ to about 0.20 g/cm$^3$. The low density allowed by this invention are an additional important aspect of these composite foams. Among the various composite foams are silica aerogel-filled polystyrene emulsion foams, resorcinol/formaldehyde-filled polystyrene emulsion foams, phloroglucinol/formaldehyde-filled polystyrene emulsion foams, polystyrene-filled polystyrene emulsion foams, silica aerogel-filled carbon foams, resorcinol/formaldehyde-filled carbon foams, phloroglucinol/formaldehyde-filled carbon foams, and polystyrene-filled carbon foams. The second polymer foam materials can be either void-filling, i.e., the second polymer foam can substantially completely fill the open cells or interstices of the first polymer foam or the second polymer foam material can be wall-coating, i.e., the second polymer foam can coat the walls of the open-celled first polymer foam. The coating upon the walls of the open-celled polymer foam can generally be from about five to fifty angstroms up to about five to ten microns in thickness. Depending upon the particular application, the thickness of the coating can be varied. The ability to form both substantially completely filled open-celled polymer foams and wall-coated open-celled polymer foams allows for a number of potential applications, e.g., low density structural materials, ion exchange media, thermal insulators, capillary wicks and the like.

The composite foam can be prepared from a first rigid, microcellular, open-celled polymeric foam, preferably an organic polymeric foam, which is at least partially filled with a second polymer foam. For example, the filled foam can generally be any open-cell organic polymer foam, such as a polystyrene emulsion foam, a carbon foam and the like, or can be a reticulated blown foam, i.e., a closed-cell foam with the faces blown out, e.g., a reticulated carbon foam. The rigid first open-cell polymer foam is generally characterized as having a density of from about 0.015 g/cm$^3$ to about 0.20 g/cm$^3$, and a pore size of from about 1 micron to about 30 microns, preferably from about 1 micron to about 10 microns. Depending upon the particular end application, the density and the pore size of the rigid first open-celled polymeric foam can be varied. For example, for use as ICF targets the density of the polymer foam is preferably from about 0.015 g/cm$^3$ to about 0.05 g/cm$^3$ while the pore size is preferably from about 1 micron to about 6 microns.

A suitable polystyrene foam can be a homopolymer of styrene or a substituted styrene, or the foam can be a copolymer of, e.g., divinylbenzene and styrene or a substituted styrene. Such polymer foams can be formed by emulsion foam techniques employing an initiator, e.g., a water soluble persulfate or an oil soluble azobisisobutyronitrile initiator. When the polystyrene is a copolymer, the monomer level of, e.g., styrene and divinylbenzene can range between 0:100 and 100:0, preferably about 90:10.

The rigid, microcellular, open-cell organic polymer foam can generally be filled with any suitable second polymer foam, e.g., a phenolic foam such as a phloroglucinol/formaldehyde foam, a resorcinol/formaldehyde foam and the like, a silica aerogel foam, a polystyrene foam and the like. Generally, the second polymer foam, used in forming the resultant composite foam, is capable of forming smaller cell sizes than the original polymer from which the rigid first open-cell polymer foam is formed. The smaller cell size of the second polymer foam is considered important in attaining the desired superior combination of properties. The second polymer foam can be either a closed-cell foam or an open-cell foam depending upon the desired application. For example, the second polymer foam may be a closed-cell foam where the intended use is as a thermal insulator with the rigid open-cell first foam serving to provide structural support. The second polymer foam may also be an open-cell foam for applications such as catalytic surfaces or chromatography. In chromatographic applications, the second polymer foam may have functional groups such as sulfonate, carboxylate, amine and phosphonate groups or the like. Such functional groups may be present within the second polymer material or may be grafted onto the second polymer foam in situ.

Phenolic foams such as a resorcinol-formaldehyde (R/F) foam or a phloroglucinol-formaldehyde foam can be prepared by admixing the preselected alcohol, i.e., a polyhydroxyaromatic such as resorcinol or phloroglucinol, an aqueous solution of formaldehyde, a suitable catalyst such as sodium carbonate. The admixture is drawn into the first open celled polymeric foam and subsequently heated to from about 30° C. to about 100° C., preferably from about 60° C. to about 80° C. to effect foam generation. The concentration of the phenolic foam precursors can generally be from about 0.01 wt % to about 30.0 wt % based upon filler solution. For complete filling of the first rigid, microcellular, open-celled polymer foam, the concentration of phenolic foam precursors is preferably from about 2 to about 10 wt % of the filler solution.

A silica foam can be prepared as the second polymer foam by admixing a solution of an alkylsilicate, e.g., tetramethylorthosilicate, in a suitable solvent such as methanol or toluene or mixtures thereof, with an aqueous admixture, e.g., water and the suitable solvent in the presence of a suitable catalyst such as fluoroboric acid or ammonium hydroxide. The resultant gel is then extracted with liquid carbon dioxide to remove methanol and other solvents. Such an extraction can be necessary to avoid collapse of the silica aerogel foam cells due to surface tension forces. When the first open-cell polymer foam is polystyrene at least a portion of the solvent is preferably toluene when filling with a silica aerogel. It is believed that toluene slightly swells the rigid polystyrene foam thereby allowing greater filling by the silica aerogel. This may be advantageous as the silica aerogel foam has a tendency to shrink upon extraction. The concentration of the silica gel precursors can generally be from about 0.01 wt % to about 30.0 wt % based upon filler solution. For complete filling of the first rigid, microcellular, open-cell polymer foam, the concentration of the silica gel precursors is preferably from about 2 to about 10 wt %.

A polystyrene foam can also be used as the filler foam for the first, rigid, microcellular, open-cell polymeric foam. In the case where the first foam is also polystyrene, the second polystyrene foam can be altered in terms of density and cell sizes to yield composite foam structures unachievable with a single polystyrene foam composition.

Also, the composite foam may include a rigid, microcellular, open-celled polymeric foam containing a coating of a second polymeric material upon the walls of the open cells. Where the second polymeric material coating the walls of the open celled polymeric foam is essentially a solid, i.e., a nonfoam material, it is contemplated that such a second material would not fill the open cells thereby leaving a porous permeable composite foam structure. Such a porous structure is essential for chromatographic applications wherein the second polymeric material has functional groups. The second polymer or polymer foam may also control accessibility to the rigid, microcellular open-celled polymeric foam material in the manner of a selective permeable barrier.

The present invention is more particularly described in the following examples which are intended as illustrative only, since numerous modifications and variations will be apparent to those skilled in the art.

The testing procedures used in analyzing the resultant composite polymer foams include the following.

The density of the foam or composite foam was determined by weight and volume measurements in a manner similar to ASTM D 1622-63.

The compressive modulus or strength of the foam or composite foam was determined in accordance with ASTM D1621-73.

Cell characteristics such as pore size and fraction open cells were determined by visual observation of scanning electron microscopy photomicrographs.

The wicking capabilities were determined at the National Bureau of Standards by placing the bottom (one end) of a foam cylinder at the surface of the liquid deuterium and measuring the weight gain over time.

EXAMPLE A

A rigid polystyrene foam was prepared by polymerizing the oil phase of a water-in-oil emulsion including a water to monomer ratio of 90:10, an amount of sorbitan monooleate surfactant or emulsifier equal to 10% by wt of the oil phase and a potassium persulfate initiator concentration equal to 0.15% by wt of the water phase at 63° Celsius (° C.) and drying the resultant material in a convection oven at 80° C. The monomer mixture included styrene and divinylbenzene in a 9:1 ratio. The emulsion was prepared by pumping the oil and water phases through a system comprised of a wire mesh, static mixer and filter into cans holding 3.6 liters of emulsion. Samples were cut from the 3600 cm$^3$ cylinders with a bandsaw. The resultant foam had a density of 0.10 gram per cubic centimeter (g/cm$^3$) as determined from weight and volume measurements. Such a foam preparation is described in further detail in Langmuir, 1988, 4, 44, and Langmuir, 1988, 4, 656, such descriptions herein incorporated by reference. Polystyrene foam samples prepared by this procedure were used in subsequent examples.

EXAMPLE 1

Silica aerogel filled polystyrene emulsion foams were prepared as follows. A first stock solution was prepared including 130.4 g of tetramethylorthosilicate (TMOS) in 250 milliliters (ml) of anhydrous methanol. A second stock solution was prepared including 48 g of water in 200 ml of methanol. Equal amounts of each stock solution were mixed and diluted with additional amounts of methanol and/or toluene as shown in Table 1 to yield the targeted density. A sample of polystyrene foam from Example A was immersed in the solution and trapped air was removed from the foam by drawing and releasing a vacuum over the solution until the foam was filled with each respective solution. Three drops of fluoroboric acid as a catalyst were added to each solution to initiate polymerization of the silica aerogel and gelation was complete within about 24 hours. Excess gel was removed from the surface of the foam which was then placed in a pressure vessel to remove solvents from the silica aerogel network. After a week of extraction with liquid carbon dioxide ($CO_2$), the temperature of the extractor was raised to 40° C. and the pressure raised to 1400 pounds per square inch (psi). The remaining $CO_2$ was then vented slowly overnight. The densities of the resultant composite foams are shown in Table 1 along with the density of an unfilled but solvent extracted polystyrene sample (blank). The samples were free of solvent and ready for machining.

Figure 2:
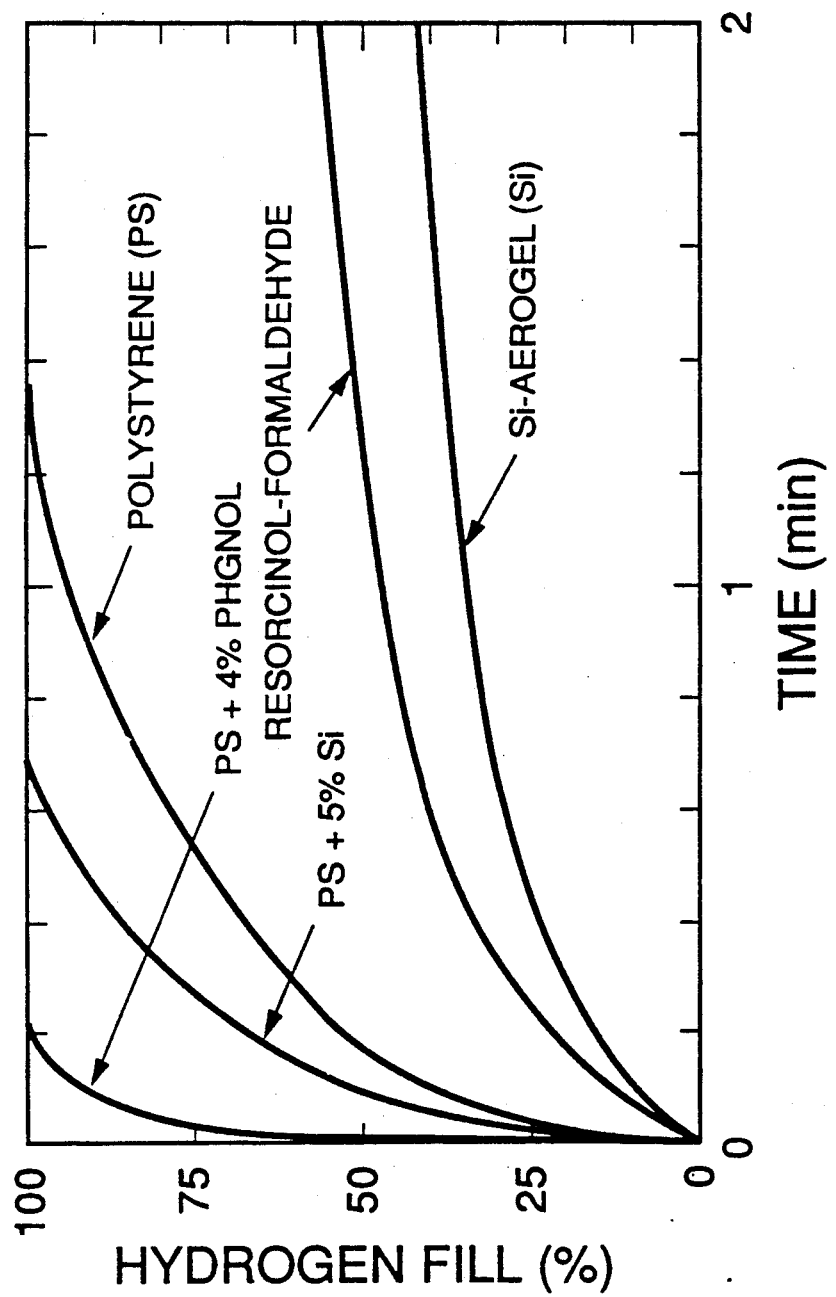
FIG. 2 is a graph of experimental results showing a comparison of the wicking capabilities of composite foams of the present invention and those of non-composite foams.

The composite foams were machined to form thin cylinders (about 6 cm in length and about 0.6 cm in diameter). The cylinders from samples 1, 2 and 3 were tested to determined their ability to wick liquid deuterium. The results of the wicking capabilities are shown graphically in FIG. 2 along with comparative values for samples of noncomposite foams from a 1987 Progress Report, Low Density Hydrocarbon Foams for Laser Fusion Targets, Lawrence Livermore National Laboratory, UCID-21080-87. It can be seen that the silica aerogel filled polystyrene composite foam had wicking capabilities superior to either polystyrene or silica aerogel foams individually.

Other machined samples were tested for compressive strength. The compressive strength measurements are shown in Table 4. It can be seen that the addition of the silica aerogel foam within the polystyrene foam increased the density of the composite foam, but did not affect the compressive strength of the composite foam.

TABLE 1

| sample no. | stock solution 1 (mls) | stock solution 2 (mls) | methanol (mls) | toluene (mls) | catalyst | density (g/cm$^3$) |
|---|---|---|---|---|---|---|
| 1-1 | 20 | 20 | — | 10 | $NH_4OH$ | 0.111 |
| 1-2 | 10 | 10 | 20 | 10 | $HBF_4$ | 0.119 |
| 1-3 | 5 | 5 | 30 | 10 | $HBF_4$ | 0.100 |
| 1-4 | 40 | 40 | — | 20 | $HBF_4$ | 0.096 |
| 1-5 | 40 | 40 | — | 20 | $NH_4OH$ | 0.132 |
| blank | — | — | — | — | — | 0.098 |

EXAMPLE 2

A resorcinol-formaldehyde foam filled polystyrene foam was prepared as follows. A 6% by weight resorcinol-formaldehyde foam was prepared by dissolving 3.25 g of resorcinol (1,3-dihydroxybenzene) and 0.05 g of sodium carbonate in 50 g of distilled water. While stirring, 25 ml of isopropanol and 4.8 g of 37% aqueous formaldehyde solution were added. The solution was placed into a bottle. A sample of polystyrene foam from Example A was immersed in the solution and trapped air was removed as in Example 1. The bottle was then capped and placed in an oven heated at 70° C. for one week. Excess reddish-amber gel was removed from the surface of the foam which was then placed in a 5% acetic acid solution at 50° C. for 24 hours. Then, the acid solution was replaced by methanol, which was replaced with fresh methanol each day for a week. The foam was placed in a pressure vessel to remove solvents from the resorcinol-formaldehyde gel network. After a week of extraction with liquid $CO_2$, the vessel was vented as in Example 1. The densities of the resultant composite foams are shown in Table 2 along with the density of an unfilled but solvent extracted polystyrene sample (blank). The samples were free of solvent and ready for machining.

The composite foams were machined to form thin cylinders (about 6 cm in length and about 0.6 cm in diameter). Machined samples 1 and 2 were tested for compressive strength. The compressive strength measurements are shown in Table 4. It can be seen that the addition of the resorcinol-formaldehyde foam within the polystyrene foam increased the density of the composite foam and also increased the compressive strength of the composite foam.

TABLE 2

| sample no. | g of 37% formaldehyde | g of resorcinol | density (g/cm$^3$) |
|---|---|---|---|
| 2-1 | 2.20 | 1.80 | 0.111 |
| 2-2 | 1.47 | 1.20 | 0.107 |
| 2-3 | 4.8 | 3.25 | 0.176 |
| 2-4 | 4.0 | 2.7 | 0.143 |
| 2-5 | 3.2 | 2.16 | 0.150 |
| blank | — | — | 0.098 |

EXAMPLE 3

A phloroglucinol-formaldehyde filled polystyrene foam was prepared in from the same manner as the resorcinol-formaldehyde filled foam of Example 2 by using phloroglucinol (1,3,5-trihydroxybenzene) in place of the resorcinol. The densities of the resultant composite foams are shown in Table 3 along with the density of an unfilled but solvent extracted polystyrene sample (blank). The samples were free of solvent and ready for machining.

The composite foams were machined to form thin cylinders (about 6 cm in length and about 0.6 cm in diameter). The cylinders from samples 1, 2 and 3 were tested to determine their ability to wick liquid deuterium. The results of the wicking capabilities are shown graphically in FIG. 2 along with comparative values for samples of noncomposite foams. It can be seen that the addition of the phloroglucinol-formaldehyde foam within the polystyrene foam increased the density of the composite foam.

TABLE 3

| sample no. | g of 37% formaldehyde | g of phloroglucinol | density (g/cm$^3$) |
|---|---|---|---|
| 3-1 | 4.86 | 4.86 | 0.167 |
| 3-2 | 3.2 | 3.2 | 0.140 |
| 3-3 | 1.6 | 1.6 | 0.140 |
| blank | — | — | 0.098 |

EXAMPLE 4

A polystyrene filled polystyrene foam was prepared as follows. A solution containing 280 g of styrene, 93.4 g of divinylbenzene and 0.69 g of azobisisobutyronitrile were dissolved in sufficient heptane to make up 1300 ml. A cylinder composed of the polystyrene foam of Example A having the dimensions 22.6 centimeters (cm) in length and 3.66 cm in diameter and a density of 0.093 g/cm$^3$ was immersed in the solution and degassed for about 15 minutes. The container was sealed, placed in an oven and heated at 60° C. for about 48 hours. The filled foam was removed from the remaining gel and dried to constant weight. The filled foam had a measured density of 0.29 g/cm$^3$.

Figure 3:
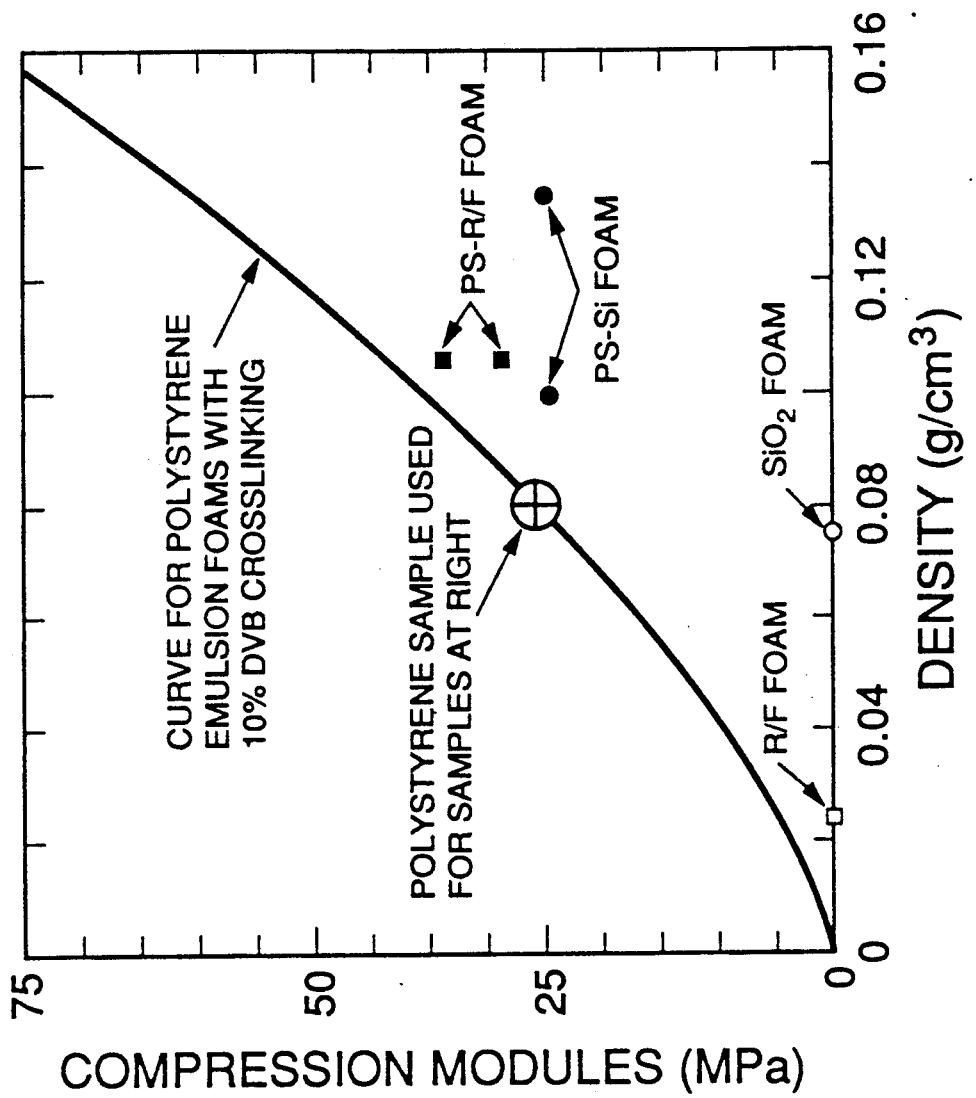
FIG. 3 is a graph illustrating compression modulus data for composite foams of the present invention compared with those of non-composite foams.

The results of compressive strength testing on samples from the examples are presented in Table 4 along with the compressive strength of an unfilled polystyrene foam (blank). Compression data is further illustrated graphically in FIG. 3.

TABLE 4

| example no. - sample | polystyrene filled w/ type foam | concentration of filler in solution (wt %) | density (g/cm$^3$) | yield strength (psi) | % comp. at yield | E (psi) |
|---|---|---|---|---|---|---|
| blank | none | — | 0.081 | 116 | 4.7 | 4000 |
| #1-5 | SiO$_2$ | 10 | 0.132 | 110 | 4.4 | 4200 |
| #1-4 | SiO$_2$ | 10 | 0.096 | 98 | 4.1 | 3900 |
| #2-1 | R-F | 3 | 0.103 | 155 | 4.4 | 5500 |
| #2-2 | R-F | 2 | 0.104 | 134 | 4.6 | 4800 |

Although the present invention has been described with reference to specific details, it is not intended that such details should be regarded as limitations upon the scope of the invention, except as and to the extent that they are included in the accompanying claims.

What is claimed is:

1. A composite foam comprising: a first rigid, microcellular, open-celled organic polymer foam having a density of from about 0.015 g/cm$^3$ to about 0.20 g/cm$^3$ and a pore size of from about 1 micron to about 30 microns, said first foam containing a second polymer foam having a density of from about 0.015 g/cm$^3$ to about 0.60 g/cm$^3$ and a pore size of from about 0.01 microns to about 1.0 micron within the open cells of said first foam, said second foam having a smaller pore size than said first foam.

2. The composite foam of claim 1 wherein the second polymer foam coats the walls of the open cells of said first foam.

3. The composite foam of claim 1 wherein the second polymer foam substantially completely fills the open cells of said first foam.

4. The composite foam of claim 1 wherein the second polymer foam is an organic polymer foam.

5. The composite foam of claim 4 wherein the second polymer foam is a closed-cell foam.

6. The composite foam of claim 4 wherein the second polymer foam is an open-celled foam.

7. The composite foam of claim 1 wherein the first open-celled organic polymer foam is selected from the group consisting of a polystyrene foam and a carbon foam, and the second polymer foam is selected from the group consisting of a silica aerogel foam, a resorcinol-formaldehyde foam, a phloroglucinol-formaldehyde foam, or a polystyrene foam.

8. The composite foam of claim 2 wherein the second polymer foam coating on the walls of the open cells of the first foam has a thickness of from about five to 50 angstroms up to about ten microns.

9. The composite foam of claim 1 wherein the first open-celled polymeric foam has a pore size of from about 1 micron to about 10 microns.

10. A composite foam material comprising a rigid, microcellular, open-celled foam selected from the group consisting of polystyrene foam or carbon foam having a density of from about 0.015 g/cm$^3$ to about 0.20 g/cm$^3$ and a pore size of from about 1 micron to about 30 microns, said polystyrene or carbon foam containing a second polymeric foam material having a density of from about 0.001 g/cm$^3$ to about 0.60 g/cm$^3$ and a pore size of from about 0.01 microns to about 1.0 micron within the open cells of the polystyrene or carbon foam, said second foam having a smaller pore size than said first foam.

11. The composite foam of claim 10 wherein the second polymeric foam material coats the walls of the open cells of the polystyrene or carbon foam.

12. The composite foam of claim 10 wherein the second polymeric foam material substantially completely fills the open cells of the polystyrene or carbon foam.

13. A cryogenic inertial confinement fusion target comprising a sphere composed of a first rigid, microcellular, open-celled foam selected from the group consisting of polystyrene and carbon foams, having a density of from about 0.015 g/cm$^3$ to about 0.10 g/cm$^3$ and a pore size of from about 1 micron to about 30 microns, said foam containing a second polymeric foam material having a density of from about 0.01 g/cm$^3$ to about 0.1 g/cm$^3$ and a pore size of from about 0.01 microns to about 1.0 microns within the open cells of the open-celled foam, said second foam having a smaller pore size than said first foam.

14. The target of claim 13 wherein the open-celled foam has a density of from about 0.015 g/cm$^3$ to about 0.05 g/cm$^3$ and a pore size of from about 1 micron to about 6 microns.

15. A composite foam material comprising a rigid, microcellular, open-celled organic polymer foam having a density of from about 0.015 g/cm$^3$ to about 0.20 g/cm$^3$ and a pore size of from about 1 micron to about 30 microns, said organic polymer containing another polymer material having a density of from about 0.001 g/cm$^3$ to about 0.60 g/cm$^3$ coating the walls of said organic polymer foam, said second mentioned polymer having a smaller pore size than said first foam.

16. The composite foam of claim 15 wherein the rigid, microcellular, open-celled polymeric foam has a pore size of from about 1 micron to about 10 microns.

17. The composite foam of claim 16 wherein the rigid, microcellular, open-celled polymeric foam is selected from the group consisting of a polystyrene foam or a carbon foam.

* * * * *